United States Patent [19]
Hoeppel

[11] 3,915,888
[45] Oct. 28, 1975

[54] OIL BASE GEL HAVING LOW VISCOSITY BEFORE GELATION AND METHOD FOR ITS PREPARATION

[76] Inventor: Raymond W. Hoeppel, P.O. Box 997, Oak View, Calif. 93022

[22] Filed: May 9, 1973

[21] Appl. No.: 358,536

Related U.S. Application Data

[63] Continuation-in-part of Ser. No. 87,631, Nov. 6, 1970, abandoned.

[52] U.S. Cl............ 252/316; 106/239; 174/110 R; 252/62; 252/63.5; 252/315; 252/389 R; 302/66
[51] Int. Cl.².... B01J 13/00; H01B 3/22; H01B 3/32
[58] Field of Search........ 252/316, 63.5, 39, 8.55 R; 106/239; 44/7 A; 302/66

[56] References Cited
UNITED STATES PATENTS

| | | | |
|---|---|---|---|
| 2,431,211 | 11/1947 | Vallandigham | 252/316 X |
| 2,505,222 | 4/1950 | Weitkamp et al. | 252/39 |
| 2,678,697 | 5/1954 | Fischer | 252/8.55 R X |
| 2,866,754 | 12/1958 | Cardwell et al. | 252/316 X |

*Primary Examiner*—Richard D. Lovering

[57] ABSTRACT

A thixotropic oil base gel having a low dielectric constant and high electrical resistivity is produced by agitating together in oil an alkali metal soap of a disproportionated rosin acid and a calcium compound that has a water solubility between 0.01 and 5 percent, and that has a pH lower than 11. Improved gelation is attained if small quantities of certain surfactants are present.

9 Claims, No Drawings

OIL BASE GEL HAVING LOW VISCOSITY BEFORE GELATION AND METHOD FOR ITS PREPARATION

This is a continuation in part of a patent application, Ser. No. 87,631, filed Nov. 6, 1970, and now abandoned.

This invention relates to the production of an oil base rigid gel having excellent electrical properties as an insulator as well as excellent water resistance and heat insulation properties. The gel is particularly well suited for the filling of voids in electrical conduit but also may be used for waterproofing, as a heat insulating medium, or for corrosion protection and the like.

Heretofore oil base gels often require high pump pressure to move them into place. This was largely because of the fast gelation rate which caused a rapid rise in apparent viscosity very soon after reacting the ingredients to form the gel, or because high viscosity oils were needed in the formulation. It would thus be very difficult to inject such a gel into a long narrow conduit. Some gel systems required heating the ingredients to facilitate gel formation and to improve mobility during placement. Other systems required the addition of large amounts of finely divided solids or appreciable quantities of water to aid in gel development, with the result that the dielectric constant was raised and the mobility of the fluid before gelation was lessened. Other gel systems were unstable in that the gels tended to deteriorate with age. Also serious syneresis occured in many of these systems.

It is the object of this invention to overcome all of these deficiencies. This is accomplished by reacting in an oil base an alkali metal soap of a disproportionated rosin acid with a calcium compound that is retardedly soluble in water and which has a pH lower than 11 in saturated solution. Agitation is necessary to effect the reaction. Improved gelation is attained if small quantities of certain surfactants are present in the fluid during agitation. These surfactants must be oil dispersible and comprise aliphatic amines, nonionic amides, ethers, carboxylic esters; monohydric phenols, aliphatic and cylcic alcohols, aliphatic sulfonates and sulfated oils and ampholytic aliphatic surfactants having amide linkages. Those surfactants listed above as aliphatic, may contain cyclic groups in addition, such as the alkyl aryl types, but the aliphatic chain must be the dominant portion imparting oil dispersibility, and should contain at least four carbon atoms. The phenols and cyclic alcohols however need not necessarily contain aliphatic chains but may contain such chains. These compounds may be considered as catalysts which promote the reaction between the soap and the calcium compound. They also may act as dispersants and as such are effective in maintaining solid reactants in suspension and in reducing the tendency of the soap miscelles to coalesce and produce a gel during agitation.

In contrast with most gel formulations, this invention does not require the presence of finely divided solids as a gel enhancing device, even in low viscosity oils. Hence the fluids of this invention, prior to gelation, can be of very low viscosity and thus ideally suited for pumping into long lengths of wire-carrying conduit to fill voids. Moreover, because the gels are thixotropic and free from any appreciable amount of finely divided solids, wires may be easily extracted from the conduit at any time after gelation has occurred because of lesser friction than where heavier oils and solids are present.

Any oil may be used as a base but it is preferred to use light refined petroleum oils such as diesel and light fuel oils, especially where cleanliness and maximum mobility of the fluid before gelation is desired.

The disproportionated rosin acid soap used in this invention is produced by saponifying a refined acid that is obtained by heating wood or gum rosin in the presence of a catalyst and in the absence of hydrogen, whereby it becomes simultaneously hydrogenated and dehydrogenated. A particularly satisfactory soap is produced by heating rosin temperatures of 150° to 300° Centigrade in the presence of a hydrogenation catalyst, such as platinum, in the absence of added hydrogen, and then purifying the resultant product by distilling it at 5 to 10 mm. pressure. The middle cut of the distillate is saponified with sodium hydroxide solution to form the sodium soap which will normally contain 5 to 30 per cent water. The resultant soap is a thick fluid and is sold under the name Dresinate 731 by the Hercules Corporation. Satisfactory disproportionated rosin acids useful in this invention when saponified contain 40 percent or more of dehydroabietic acid. Details concerning production of these acids appear in U.S. Pat. No. 2,154, 629 and U.S. Pat. No. 2,485,616.

The rosin soap concentration in the gel may vary between 1 and 8 percent depending upon the required rigidity of the gel. The amount used will be somewhat dependent upon the type of oil used. Larger amounts produced the more rigid gels.

The retardedly water soluble calcium compound used in this invention should have a water solubility between about 0.01 and 5 percent, the optimum concentration being between 0.1 and 0.5 percent. Preferred compounds are gypsum or anhydrite. Among the other usable compounds are calcium tartrate or citrate, or calcium bentonite. In the latter instance the calcium is base exchanged on the clay and becomes available for the reaction with the soap.

An amount of the calcium compound should be used that is at least stoichiometrically equivalent to the soap, and a slight excess is preferred. A large excess will cause a weakening of the final gel, especially where the water solubility is in the higher range. The calcium compound should be finely ground to improve the reaction rate.

Although calcium oxide, or hydroxide, satisfies the requirements of solubility, it is comparatively ineffective in producing a satisfactory gel when reacted with the soap. To produce satisfactory gels with lime, more soap is required and in addition, finely divided solids, heavier oils or additional water must be added to build up gel, resulting in a fluid that is thick and difficult to pump because of the high apparent viscosity. Such fluids have high dielectric constants and are not as satisfactory for use as electrical insulators. In this invention the calcium compound should not have a pH above 11 in saturated solution, whereas the pH of lime is much higher than this.

The reaction between the calcium compound and the soap forms micelles which comprise the calcium soaps of the rosin acids present, these interlocking on standing to produce the rigid gel. The small amount of water present in the soap suffices to enable the reaction to occur. Excess water in the gel, more than about 3 to 4 percent, causes a rapid buildup of initial gel, resulting n greater difficulty in moving the fluid to location, and also results in a weaker final gel and poorer electrical properties.

The soap and calcium compound can be added in any order to the oil, but it is preferred to add the calcium compound last. Agitation should be started when the ingredients are in the oil and preferably while adding ingredients. Agitation should be continued for several minutes after the reaction has begun. The fluidic mixture is then pumped or otherwise moved into place and then allowed to remain in a quiescent state during which time it is transformed from a fluidic into a gelled condition. Preferably there should be no interruption of agitation until the fluid is moved into place, as during any quiescence, some gel will begin to form which will be broken on later agitation resulting in a weaker ultimate gel.

Where a low density is required, a gas such as air may be entrained in the fluid prior to gelation after incipient gelation has occured. Gas introduction is accomplished by means of a Venturi or otherwise. The gas will remain entrained after an incipient gel has begun to form and even on further agitation will hold this gas largely intact. The resultant low density gels are low in cost and are excellent heat and electrical insulators.

At lower temperatures longer mixing is required to initiate the gelation. Best results are obtained at temperatures between 60° to 120°F. The resultant gels are stable even after long aging at elevated temperatures, and can be produced with very little syneresis. Being thixotropic, the gel may be broken down at any time after aging.

It has been found that certain catalysts are advantageous in promoting the soap reaction and are especially useful when the fluids are mixed at lower temperatures, where the reaction rate is slow. Such catalysts are surfactants comprising aliphatic amines nonionic amides, ethers, carboxylic esters, monohydric phenols, cyclic alcohols, aliphatic alcohols, aliphatic sulfonates and sulfated oils, and ampholytic aliphatic surfactants with amide linkages These surfactants must be oil dispersible and should be added in amounts of from 0.02 to 2 percent. The amount added will depend upon the equivalent weight of the surfactant and upon its reactivity. Also the type of base oil used will have a bearing on the amount of surfactant used. Where compatible, mixtures of these surfactants may be used. Excessive amounts of these surfactants may weaken the ultimate gel.

It has been found that some advantage may be had by maintaining the pH of the aqueous phase above 9 by means of an alkalizer. Although alkali metal hydroxides may be used it is preferred to use lime instead. Where surfactants are present, there is sometimes some free acid impurity present in them which weakens the gel, but which is removed by the alkalizer with a resultant improvement in the gel. Also free acids may be formed in some greases on long standing by oxidation of specific ingredients in the greases, and the alkalizer serves to neutralize such acids thus preventing gel deterioration. If too much alkalizer is used, the ultimate gel may be weakened and electrical characteristics impaired, especially when alkali metal hydroxides are used.

In order to demonstrate this invention a series of experiments were performed wherein retardedly soluble calcium compounds were reacted with an alkali metal soap of a disproportionated rosin acid, using a 35° API diesel fuel as the vehicle. Except for the first example, reactions were carried out at room temperature and the fluids were stirred for 5 minutes during makeup, they were then aged in a quiescent state at room temperature. In nearly all of the tests the soap used was Dresinate 731, previously described. Generally all ingredients were present before stirring was begun. In many tests the beneficial effects of added alkalizers and surfactant additives were demonstrated.

After standing 18 hours at room temperature the degree of firmness of each gel was evaluated by probing with a spatula, assigning index numbers from 1 to 8 to indicate the firmness of the gels. To correlate these numbers with the actual shear strength, numerous gels of differing firmness were evaluated both by probe and by the Baroid Shearometer in accordance with standard API procedure, and a range of shear strength was established for each degree of firmness indicated by a respective index number. Where gels were very firm, beyond the capability of measurement with the standard shearometer, additional weight was added to the shearometer tube and the true readings were then calculated by multiplying the shearometer reading by a factor related to the additional weight used. Results of the correlation between these gel index numbers and the actual shear strength appear in the following table.

TABLE 1

| Gel Firmness Index | Shear Strength lbs./100 sq. ft. |
|---|---|
| Liquid | 0 to 6 |
| 1 | 6 to 15 |
| 2 | 15 to 25 |
| 3 | 25 to 40 |
| 4 | 40 to 100 |
| 5 | 100 to 180 |
| 6 | 180 to 300 |
| 7 | 300 to 600 |
| 8 | 600 to 1000 |

In addition to evaluating gel firmness, each gel was observed for any syneresis, or top settling, and for any settling of solids material at the bottom. Where the syneresis was less than 2 to 3 percent, it was classified as no syneresis, as this amount is considered negligible. A syneresis of greater than 20 per cent was considered to be severe. It is obvious that syneresis and settling of a gel, especially when it is situated within a lateral conduit, is considered to be undesirable, whereas in vertical conduit it can be more readily tolerated.

EXAMPLE 1

A series of tests were conducted where in reactions between Dresinate 731 (4 percent present) and various calcium compounds were carried out in a diesel vehicle at 105°F., stirring for 5 minutes. Results follow.

| Test No. | Calcium Compound | | After standing 18 hrs. at room temperature | | |
|---|---|---|---|---|---|
| | % | type | Syneresis | Gel | Settling |
| 1 | 1.2 | Calcium oxide | slight | liquid | none |
| 2 | 0.6 | Calcium sulfate | none | 6 | none |
| 3 | 1.2 | Calcium sulfate | none | 7 | none |
| 4 | 2.4 | Calcium sulfate | none | 5 | none |
| 5 | 0.6 | Calcium chloride | none | liquid | none |
| 6 | 2.0 | Calcium citrate | none | 5 | none |

-Continued

| Test No. | Calcium Compound | | After standing 18 hrs. at room temperature | | |
|---|---|---|---|---|---|
| | % | type | Syneresis | Gel | Settling |
| 7 | 2.0 | Calcium tartrate | none | 1 | none |
| 8 | 4.0 | Calcium bentonite | slight | 2 | none |

At the end of the stirring period all above fluids were very low in viscosity, except where the highly water soluble calcium chloride was present, where the gel developed rapidly, raising the apparent viscosity. Despite this high gel rate, the fluid remained pourable even after 18 hours standing. Where the retardedly water soluble calcium compounds were used, an excellent gel was developed on standing in most instances, except when calcium oxide was used. The pH of calcium oxide in saturated solution is higher than 12, whereas the pH of all other calcium compounds used was below 10. The retardedly soluble calcium compounds had water solubilities between 0.01 and 5 percent The most effective compound, calcium sulfate, had a water solubility of 0.17 percent and a pH in saturated solution of 8.4 units.

It is theorized that when highly soluble calcium compounds are reacted with the rosin soap, the resultant high concentration of calcium in the aqueous phase produces flocculation of the calcium soap miscelles and thus reducing their ability to interlock properly and produce a thixotropic gel. On the other hand, when a retardedly soluble calcium compound is reacted with the soap, the calcium ion concentration is lower, but is sufficient to provide for the metathesis which occurs more slowly and without appreciable flocculation. Thus firmer gels are produced. This is further demonstrated in the following example.

EXAMPLE 2

A diesel oil containing 4 percent Dresinate 731 and 0.5 percent lime was treated with various calcium compounds, stirred 5 minutes and aged at room temperature. Results appear below.

| Test No. | Calcium Compound | | After 18 hrs. at room temperature | | |
|---|---|---|---|---|---|
| | % | Type | Syneresis | Gel | Settling |
| 1 | 0.6 | Calcium sulfate | slight | 5 | none |
| 2 | 1.2 | Calcium sulfate | slight | 5 | none |
| 3 | 0.7 | Calcium acetate | severe | 1 | severe |
| 4 | 1.4 | Calcium acetate | severe | liquid | severe |
| 5 | 1.0 | Calcium chloride | none | 1 | none |
| 6 | 0 | | severe | 1 | severe |

In the above tests the calcium acetate was produced in situ by addition of acetic acid to the lime-oil mixture. While stirring, the fluids containing the highly water soluble calcium acetate or chloride developed considerable viscosity due to gel formation and would be thus more difficult to pump, while these containing the retardedly soluble calcium compounds, remained thin and easily pumpable. The only satisfactory results were obtained with calcium sulfate, a retardedly soluble compound having a pH of 8.4 units.

Another advantage of the retardedly soluble calcium compounds over the highly soluble types is that overtreatment is less likely with the former. This is exemplified by comparing tests 1 and 2 with 3 and 4. Thus in test 2, the higher concentration of calcium sulfate did not impair the gel, whereas in test 4, the higher concentration of calcium acetate further impaired the gel.

EXAMPLE 3

To demonstrate the catalytic effect of certain anionic surfactants, a series of tests were made wherein a diesel oil containing 4 percent Dresinate 731 and 0.6 calcium sulfate was treated with various alcohols and sulfonates, the fluids being made up and aged as above. Results follow.

| Test No. | Base | | Surfactant | | After 18 hrs. at Room temperature | | |
|---|---|---|---|---|---|---|---|
| | % | Type | % | Type | Syneresis | Gel | Settling |
| 1 | 0 | | 0 | | severe | | severe |
| 2 | 0 | | 0.2 | cyclohexanol | none | 7 | none |
| 3 | 0 | | 0.2 | isoamyl alcohol | slight | 4 | slight |
| 4 | 0 | | 0.2 | cetyl alcohol | slight | 6 | slight |
| 5 | 0 | | 0.2 | crotyl alcohol | none | 8 | none |
| 6 | 0 | | 0.2 | oleyl alcohol | slight | 8 | slight |
| 7 | 0.5 | CaO | 0.2 | Oleyl alcohol | none | 8 | slight |
| 8 | 0.5 | CaO | 0.2 | tallow alcohol | none | 7 | none |
| 9 | 0 | | 0.2 | polypropylene glycol | slight | 8 | none |
| 10 | 0 | | 0.4 | sulfonated castor oil | severe | | severe |
| 11 | 0.1 | NaOH | 0.4 | sulfonated castor oil | slight | 4 | none |
| 12 | 0.5 | CaO | 0.4 | sulfonated castor oil | none | 8 | none |
| 13 | 0 | | 0.4 | sulfated oleyl alcohol | severe | | severe |
| 14 | 0.1 | NaOH | 0.4 | sulfated oleyl alcohol | slight | 4 | none |
| 15 | 0 | | 0.2 | sulfonated sperm oil | none | 8 | none |
| 16 | 0 | | 0.2 | sulfonated tallow | none | 8 | none |
| 17 | 0.5 | CaO | 0.2 | alpha-sulfo-palmitic acid | none | 8 | none |
| 18 | 0.5 | CaO | 0.2 | bis tridecyl sulfo-succinic acid | none | 6 | slight |
| 19 | 0 | | 0.2 | sodium methyl oleyl taurate | none | 5 | none |

TABLE-Continued

| Test No. | Base | | Surfactant | | After 18 hrs. at Room temperature | | |
|---|---|---|---|---|---|---|---|
| | % | Type | % | Type | Syneresis | Gel | Settling |
| 20 | 0 | | 0.2 | calcium petroleum sulfonate | none | 6 | none |
| 21 | 0.5 | CaO | 0.35 | dodecylbenzine sulfonic acid | none | 4 | none |
| 22 | 0 | | 0.2 | Cycloheptanol | none | 8 | none |
| 23 | 0 | | 0.8 | alphaterpineol | slight | 5 | slight |

All above surfactants were oil dispersible, including the glycol. Non-oil-dispersible alcohols, such as ethanol are of little value in this invention. The beneficial effect of an alkalizer, such a NaOH or CaO in some of these formulations is demonstrated in tests 7, 8, 11, 12, 14, 17, 18 and 21. The alkalizer is particularly useful to reduce syneresis and settling where the surfactant is an acid or when it contains acidic impurities. Lime is preferred to alkali metal hydroxides. The taurate in test 19 has an amide linkage and may be considered to be an ampholytic surfactant. The tems sulfated and sulfonated are used more or less interchangeably because of the confusion in terminology existing today. Both types are useful in this invention however. On aging 90 days at room temperature all of the satisfactory gels either improved or remained the same.

EXAMPLE 4

To demonstrate the beneficial effect of non-ionic surfactants on gelation a series of fluids were made up in diesel oil containing 4 percent Dresinate 731 and 0.6 percent calcium sulfate and were stirred and aged as as above. Results appear below.

| Test No. | Surfactant | | After 18 hrs. at room temperature | | |
|---|---|---|---|---|---|
| | % | Type | Syneresis | Gel | Settling |
| 1 | 0 | | severe | | severe |
| 2 | 0.2 | glycerol mono-oleate | slight | 6 | none |
| 3 | 0.2 | sorbitan mono-oleate | slight | 5 | slight |
| 4 | 0.2 | polyethylene glycol mono-oleate | none | 7 | none |
| 5 | 0.2 | diethylene glycol ethyl ether | none | 8 | none |
| 6 | 0.2 | ethoxy tallow alcohol | none | 8 | none |
| 7 | 0.2 | ethoxy nonyl phenol | none | 7 | none |
| 8 | 0.2 | ethoxylated castor oil | none | 6 | none |
| 9 | 0.2 | oleoamide | slight | 8 | none |
| 10 | 0.2 | coco alkanolamide | slight | 8 | none |
| 11 | 0.2 | oleyl sarcosine | none | 6 | none |

In test 2 the glycol used in the ester was oil dispersible and had a viscosity of 35 centistokes at 100° F. The ethoxylated compounds of tests 6 and 7 were of medium chain length and were oil dispersible. The ethoxylated castor oil was of short chain length and was highly oil dispersible. The long chain length ethoxylated compounds are generally not enough oil dispersible to be useful in this invention. The oleyl sarcosine contained an amide linkage and can be considered to be ampholytic in nature.

These oil dispersible non-ionic surfactants lessened syneresis and settling and improved the gel. On standing 90 days at room temperature, all of the gels above became firmer.

EXAMPLE 5

Diesel fuel containing 4 percent Dresinate 731 and 0.6 percent calcium sulfate was treated with various phenols, and stirred and aged as above. Results follow.

| Test No. | Phenol added | | CaO | After 18 hrs. at room temperature | | |
|---|---|---|---|---|---|---|
| | % | Type | % | Syneresis | Gel | Settling |
| 1 | 0 | | 0 | severe | | severe |
| 2 | 0.25 | 2,4 dinitrophenol | 0 | slight | 6 | none |
| 3 | 0.4 | p-chlorophenol | 0 | slight | 7 | none |
| 4 | 0.4 | meta cresol | 0 | none | 8 | none |
| 5 | 0.4 | phenol | 0 | none | 8 | none |
| 6 | 1.2 | phenol | 0 | none | 7 | none |
| 7 | 0.2 | nonyl phenol | 0 | severe | | severe |
| 8 | 0.6 | nonyl phenol | 0 | none | 7 | none |
| 9 | 0.4 | mixed xylenols | 0 | none | 6 | none |
| 10 | 1.2 | octyl phenol | 0 | none | 8 | none |
| 11 | 0 | | 0.4 | slight | 4 | none |
| 12 | 0.4 | p-benzyl chlorophenol | 0.4 | none | 6 | none |

The mixed xylenols were dominantly 3, 5 and 2, 3 xylenols. The above phenols were oil dispersible. On aging 60 to 90 days, all gels either improved or remained the same as above except for that of test 12 which deteriorated slightly. Comparing tests 1 and 11 it is seen that the addition of lime greatly lessened settling and syneresis in fluids not containing surfactants.

EXAMPLE 6

To demonstrate the effect of various amines on gelation, a series of fluids made up in diesel fuel and containing 4 percent Dresinate 731 and 0.6 percent calcium sulfate, were treated with various amines. They were made up and aged as before. Results follow.

| Test No. | CaO | Amine added | After 18 hrs. at room temperature | | |
|---|---|---|---|---|---|
| | % | % Type | Syneresis | Gel | Settling |
| 1 | 0 | 0 | severe | | severe |
| 2 | 0 | 0.2 capryl amine | none | 8 | none |
| 3 | 0 | 0.2 iso octyl amine | slight | 5 | none |
| 4 | 0.5 | 0.2 iso octyl amine | none | 8 | none |
| 5 | 0 | 0.2 dodecyl amine | none | 8 | none |
| 6 | 0 | 0.2 ethoxy coco amine | slight | 5 | slight |
| 7 | 0 | 0.2 alkyl amido propylene diamine | none | 8 | none |
| 8 | 0 | 0.8 alkyl amido propylene diamine | severe | | severe |
| 9 | 0 | 0.2 heptadecynal imidazole | none | 8 | none |
| 10 | 0 | 0.08 octadecyl amine | none | 6 | none |
| 11 | 0 | 0.08 stearyl dimethyl benzyl ammonium chloride | none | 6 | none |
| 12 | 0 | 0.2 alkyl trimethylene diamine | none | 5 | none |
| 13 | 0.4 | 0.2 phenyl stearyl dimethyl ammonium chloride | none | 7 | none |

The ethoxylated amine in test 6 contained a short ethoxy chain. The alkyl group in the amine of tests 7 and 8 was from oleic and linoleic acids. The diamine in test 12 was derived from tallow. All surfactants used were oil dispersible. On aging 90 days at room temperatures all initially satisfactory gels either remained the same or improved in firmness. Note that in test 8, overtreatment with the amine impaired the gel.

EXAMPLE 7

To illustrate the beneficial effect of finely divided oil insoluble solids on the gels of this invention, a diesel fuel containing 4 percent Dresinate 731 was treated with 1.2 percent calcium sulfate and small amounts of finely divided solids. The fluids were made up and aged as above. Results follow.

| Test No. | Solids | After 18 hrs. at room temperature | | |
|---|---|---|---|---|
| | % Type | Syneresis | Gel | Settling |
| 1 | 0 | severe | | severe |
| 2 | 2 asbestos | none | 8 | none |
| 3 | 2 diatomaceous earth | slight | 8 | none |

It is thus seen that asbestos or diatomaceous earth greatly lessened syneresis and settling and produced excellent gels. These gels improved on aging. The use of such fillers, however, will raise the dielectric constant of the gel.

Other finely divided solids useful in this invention are clays, siliceous compounds, barite, limetsone and the like. Amounts used will vary from 0.1 to 30 percent.

EXAMPLE 8

A disproportionated rosin soap was prepared by reacting 6 grams of dehydroabietic acid with 2 grams of KOH in solution and the resultant soap was added to a diesel fuel in an amount of 3 percent together with 0.6 percent calcium sulfate. After stirring 5 minutes at room temperature it was aged at room temperature. After 18 hours the resultant gel had a firmness of 4 and showed no syneresis or settling.

EXAMPLE 9

A gel was prepared by stirring 3.3 percent Dresinate 731, 0.2 percent cyclohexanol and 0.7 percent gypsum in an oil composed of 40 parts of diesel oil and 60 parts of a medium viscosity polybutene oil.

After aging 1 day at room temperature the gel had a firmness of 8, with no syneresis or settling. On aging 5 months in an open container, slight syneresis developed and the gel rigidity was reduced to 5. The pH of an aqueous extract of this gel after aging was found to be 8.4 units.

A second gel was similarly prepared except that 0.02 percent sodium hydroxide was added in addition. This gel did not deteriorate after aging 5 months and at that time the pH of the aqueous extract of the gel was found to be 9.5 units.

It is thus concluded that in some gel systems, wherein acids may be produced on aging, an alkalizer should be present to maintain the pH above 9 so that gel deterioration will not occur. Although the use of more alkalizer to raise the pH still higher will not normally degrade the gel, it may impair electrical characteristics.

What is claimed is:

1. A method of producing a gelled thixotrophic oil and transferring said oil to a permanent location while still fluid comprising the steps of adding to an oil base from 1 to 8 percent of an alkali metal soap of a disproportionated rosin acid and a finely divided calcium compound having retarded water solubility of between 0.01 and 5 percent, and having a pH in saturated solution of less than 11, said calcium compound being added in an amount at least stoichiometrically equivalent to said soap, briefly agitating the resultant fluidic mixture to promote a chemical reaction between said soap and calcium compound, and after reaction has begun, transferring said fluid to said permanent location and thereafter allowing said fluid to remain in a quiescent state whereupon said fluid is transformed into a stable, water-resistant, thixotropic gel having a low dielectric constant and high electrical resistivity.

2. A method according to claim 1 wherein there is added in addition prior to gelation from 0.02 to 2 percent of an oil-dispersible surfactant selected from a group consisting of monohydric phenols, alcohols, amines, sulfonates, sulfated oils, nonionic amides, ampholytic surfactants with amide linkages, ethers and carboxylic esters, each of the latter seven surfactants containing at least one aliphatic group of at least four carbon atoms.

3. A method according to claim 1 wherein there is added in addition, prior to gelation, sufficient base to maintain the pH of the aqueous phase above 9.

4. A method according to claim 1 wherein there is added in addition, prior to gelation, from 0.1 to 30 percent of finely divided oil insoluble solids.

5. A method according to claim 1 wherein said calcium compound is calcium sulfate.

6. A method according to claim 3 wherein said base is lime.

7. A gelled thixotropic composition having a low dielectric constant and high electrical resistivity prepared by intermixing in an oil base from 1 to 8 percent of an alkali metal soap of a disproportionated rosin acid with at least a stoichiometric amount of a finely divided, retardedly water soluble calcium compound having a water solubility of between 0.01 and 5 percent, and having a pH in saturated solution of less than 11.

8. A composition according to claim 7, including in addition from 0.02 to 2 percent of an organic oil-dispersible surfactant selected from a group consisting of monohydric phenols, alcohols, amines, sulfonates, sulfated oils, nonionic amides, ampholytic surfactants with amide linkages, ethers and carboxylic esters, each of the latter seven surfactants containing at least one aliphatic group of at least four carbon atoms.

9. A composition according to claim 8, including in addition sufficient base to maintain the pH of the aqueous phase above 9.

* * * * *